United States Patent
Grant et al.

(10) Patent No.: US 10,807,898 B2
(45) Date of Patent: Oct. 20, 2020

(54) GLASS CONTAINER WITH EMBOSSED INDICIA

(71) Applicant: Owens-Brockway Glass Container Inc., Perrysburg, OH (US)

(72) Inventors: Edward A. Grant, Toledo, OH (US); Delia Norith Sanchez Parada, Lima (PE)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 237 days.

(21) Appl. No.: 15/923,856

(22) Filed: Mar. 16, 2018

(65) Prior Publication Data

US 2019/0284080 A1    Sep. 19, 2019

(51) Int. Cl.
| | |
|---|---|
| C03B 9/347 | (2006.01) |
| C03B 9/32 | (2006.01) |
| B65D 23/14 | (2006.01) |
| B65D 1/02 | (2006.01) |
| B65D 1/40 | (2006.01) |

(52) U.S. Cl.
CPC ............... *C03B 9/347* (2013.01); *B65D 1/02* (2013.01); *B65D 1/40* (2013.01); *B65D 23/14* (2013.01); *C03B 9/32* (2013.01); *B65D 2203/00* (2013.01); *B65D 2501/0045* (2013.01)

(58) Field of Classification Search
CPC ....................... C03B 9/347; C03B 9/32; B29C 49/28–49/40; B29C 49/48–49/54
See application file for complete search history.

(56) References Cited

U.S. PATENT DOCUMENTS

| | | | | |
|---|---|---|---|---|
| 2011/0073211 | A1* | 3/2011 | Onodera | B29C 44/5627 138/177 |
| 2011/0089133 | A1* | 4/2011 | Dygert | B29C 49/48 215/250 |
| 2014/0158659 | A1* | 6/2014 | Paredes | B65D 23/00 215/43 |
| 2015/0096913 | A1 | 4/2015 | Kitcher et al. | |
| 2015/0336320 | A1* | 11/2015 | Poulat | B65D 1/0207 53/453 |
| 2017/0129654 | A1* | 5/2017 | Funato | B29C 49/48 |

OTHER PUBLICATIONS

International Search Report and Written Opinion, Int. Application No. PCT/US2019/021796, Int. Filing Date: Mar. 12, 2019, Applicant: Owens-Brockway Glass Container Inc., dated May 27, 2019.

\* cited by examiner

*Primary Examiner* — Erin Snelting (57) ABSTRACT

A glassforming blank mold having an internal surface and an engraving in the internal surface, wherein the engraving, in cross section, includes a radially outward surface having a circumferential width, and sidewalls connecting the radially outward surface to the internal surface of the blank mold, and including fillets between the radially outward surface and the sidewalk, and rounds between the sidewalls and the internal surface of the blank mold, such that the sidewalls are not straight but, instead, are continuously curving. A method of making a glass container using the mold is also disclosed, as is the glass container itself.

13 Claims, 11 Drawing Sheets

GLASS CONTAINER WITH EMBOSSED INDICIA

The present disclosure is directed to containers and, more particularly, to glass containers and related manufacturing methods and equipment.

DISCLOSURE

In general, glass bottles typically include a body, a shoulder, a neck, and a neck finish. Such bottles may be produced using a blow-and-blow manufacturing process or a press-and-blow manufacturing process.

U.S. Pat. No. 8,333,287 discloses a method of producing a longneck bottle by pushing a parison neck against a debossed internal surface of a blank mold to form a radially thick. external embossment on the parison neck, and then blowing the embossed parison neck against an internal surface of a blow mold to push the external embossment on the neck through the wall of the neck to form a radially thick and inwardly projecting embossment in the bottle so as to affect flow of liquid thereover. A commercial implementation of the method includes use of mold debossments/engravings that are radially deep and circumferentially wide: 0.64 mm deep, and 3.6 mm wide, wherein the entirety of the engravings are defined by a continuously curving surface defined by a single fillet of 2.8 mm radius and rounds of 3.2 mm radius on either circumferential side of the fillet. Such dimensions were chosen to produce a radially thick embossment projecting radially inwardly so as to provide good agitation or directional control of liquid flowing thereover.

U.S. Patent Application Publication 2015/0096913 discloses a method of producing a glass container having sharply outlined indicia. The method includes forming an embossment on an exterior surface of a parison, and pushing the embossment against a blow mold internal surface to collapse the embossment into a wall of the container without pushing corresponding material through the wall of the container into an interior of the container. The method includes use of mold debossments/engravings that are 0.3 mm thick and 3 mm wide, with a radially outward surface, straight/flat sidewalls angled at 45 to 75 degrees, fillets of 0.3 mm between the outward surface and the sidewalk, and rounds of 0.15 mm between the sidewalls and an interior surface of the mold. Such dimensions were chosen to produce indicia of good resolution in an exterior surface of a container.

SUMMARY OF THE DISCLOSURE

The present disclosure embodies a number of aspects that can be implemented separately from or in combination with each other.

In accordance with the disclosure, there is provided a glassforming blank mold having an internal surface and an engraving in the internal surface. The engraving, in cross section, includes a radially outward surface, and sidewalls connecting the radially outward surface to the internal surface of the blank mold. Each sidewall comprises a fillet and a round between the radially outward surface and the internal surface of the blank mold, such that the sidewalls are not straight but, instead, are continuously curving.

In accordance with particular aspects of the disclosure, a circumferential width of the radially outward surface is at least 1.0 mm, a radial thickness between the internal surface and the radially outward surface is from 0.2 mm to 0.4 mm, the fillets have radii between 0.2 mm and 0.4 mm, the rounds have radii between 1.25 mm and 1.75 mm, a circumferential overall width of the engraving is at least 1.8 mm, and the sidewalls are characterized by a tangent between the fillets and the rounds, and wherein each fillet extends over an angle of less than 90°.

In accordance with other particular aspects of the disclosure, a ratio of the radii of the fillets to the engraving radial depth is between 0.5:1 and 2:1. Also, a ratio of the radii of the rounds to the engraving radial depth is between 3:1 and 9:1. Similarly, a ratio of the radii of the rounds to the radii of the fillets is between 3:1 and 9:1. Additionally, a ratio of the container wall thickness to the engraving radial depth is between 3:1 and 15:1.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION OF PREFERRED EMBODIMENTS

Figure 1:
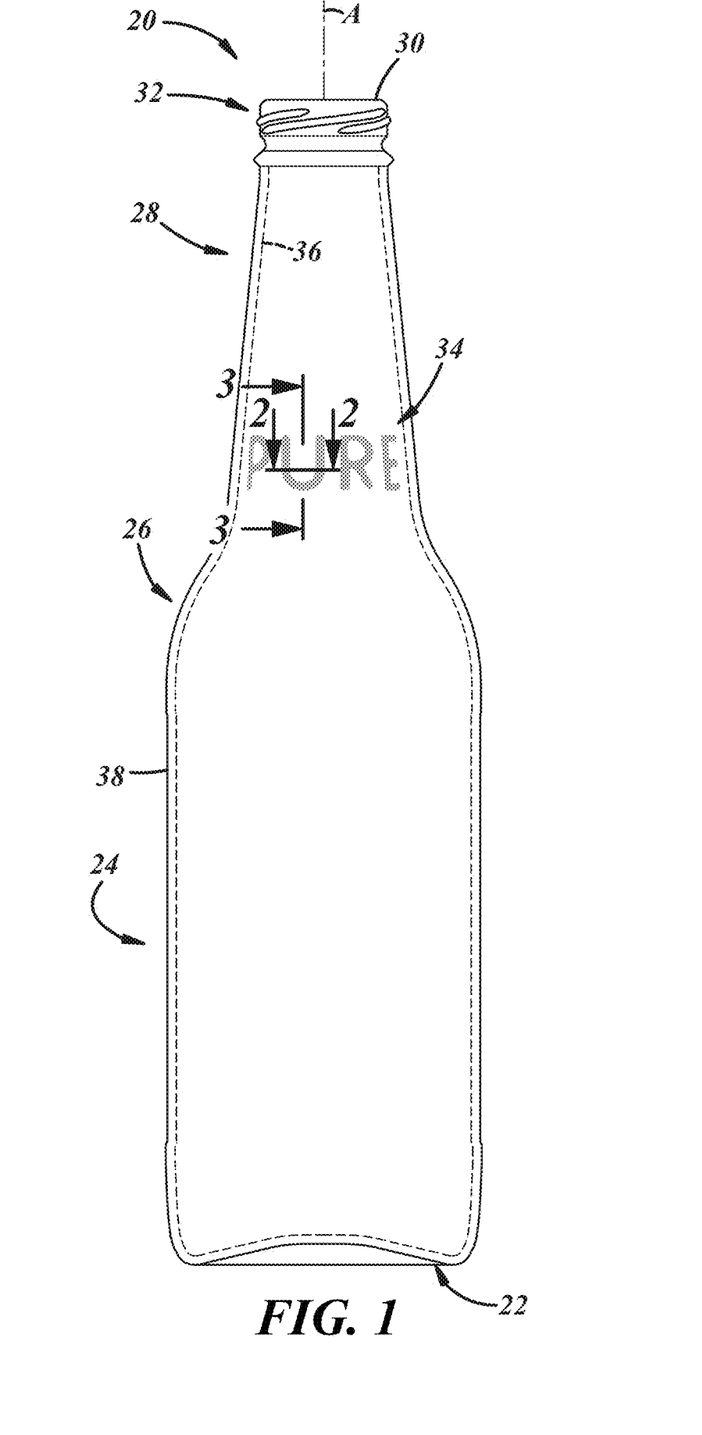
FIG. 1 is an elevational view of a longneck beer bottle having well-defined, legible radially inwardly projecting text, in accordance with an illustrative embodiment of the present disclosure.

FIG. 1 illustrates a container 20, which may be a bottle, extending along a longitudinal central axis A in accordance with one illustrative embodiment of the present disclosure. The container 20 may include a closed base 22, a body 24 extending longitudinally from the base 22 at one end of the body 24, a shoulder 26 extending longitudinally and radially inwardly from another end of the body 24, and a neck 28 extending longitudinally from the shoulder 26 terminating in a lip 30. The container 20 also includes a neck finish 32 axially spaced from the shoulder 26 and terminating the neck 28, and including one or more features for attachment of a desired closure (not shown). In an embodiment, the neck finish 32 may have an external closure diameter of not more than 36 mm.

According to the present disclosure, the container 20 includes integral indicia 34 in a generally radially inwardly facing inner, interior, or internal surface 36 of the container 20. As illustrated in FIG. 1, the indicia 34 includes block text, but also or instead may include script lettering, logos, graphics, or any other readable indicia. As will be described in further detail herein below, the indicia 34 is formed according to a presently disclosed method.

The container 20 may be of any suitable shape and size, may be composed of glass, may be fabricated by press-and-blow and/or blow-and-blow manufacturing operations, or by any other suitable technique(s), and may be used for containing, for example, a beverage, for instance, beer, wine, spirits, soda, or the like, or any other any flowable product. The container 20 is of one-piece integrally formed construction, for, example, of glass, ceramic, or plastic construction. (The term "integrally formed construction" does not exclude one-piece integrally molded layered glass constructions of the type disclosed for example in U.S. Pat. No. 4,740,401, or one-piece glass bottles to which other structure is added after the bottle-forming operation.)

Figure 2:
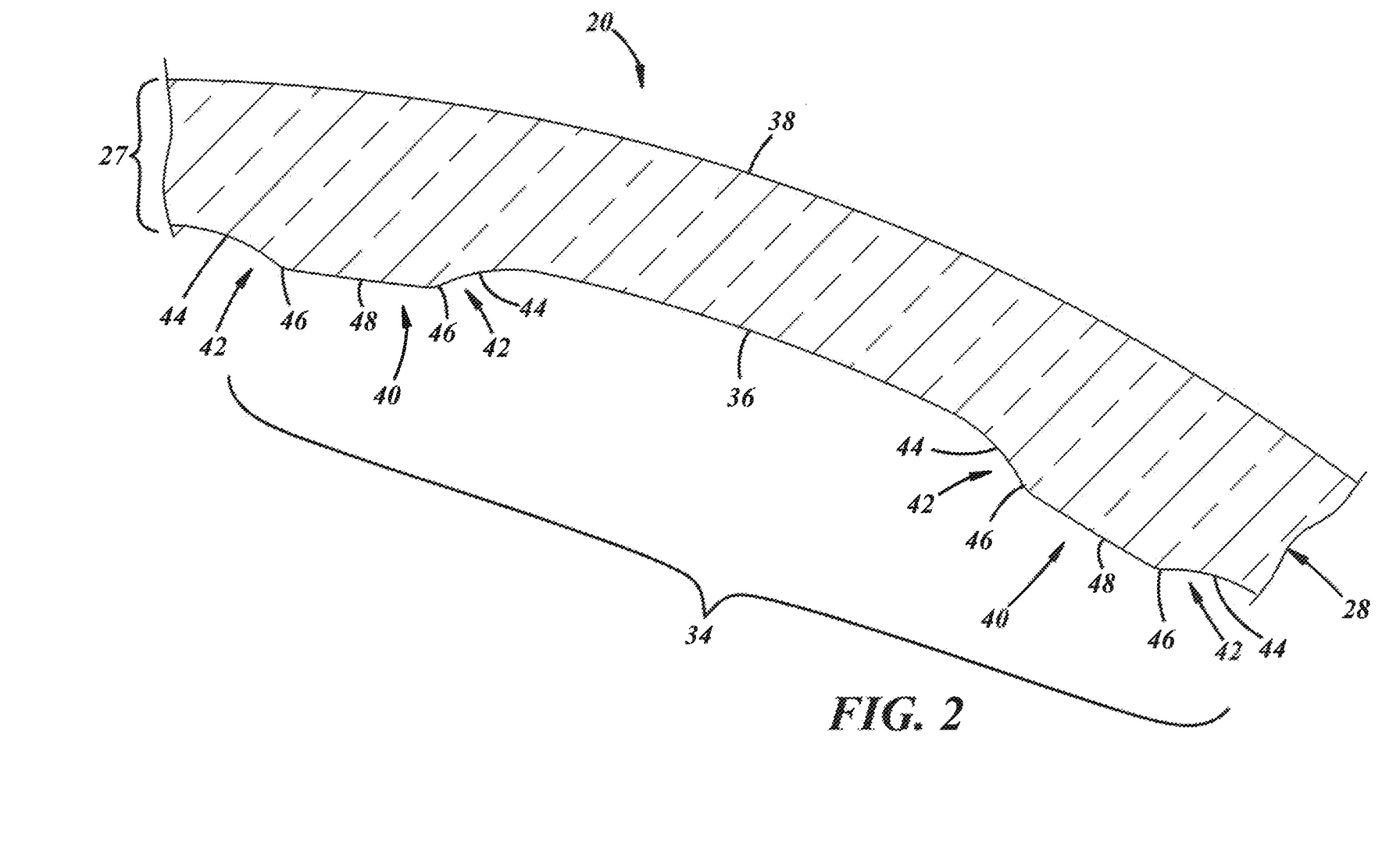
FIG. 2 is an enlarged, fragmentary, transverse cross-sectional view of the bottle of FIG. 1, taken along line 2-2 of FIG. 1.
Figure 3:
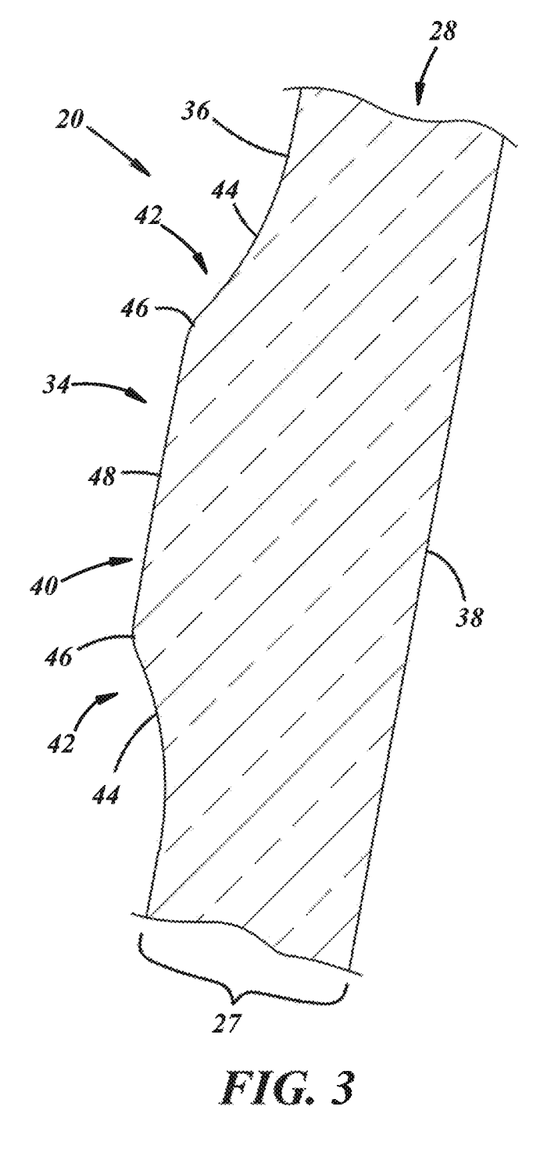
FIG. 3 is an enlarged, fragmentary, longitudinal cross-sectional view of the bottle of FIG. 1, taken along line 3-3 of FIG. 1.

With reference to FIGS. 2 and 3, the container 20 includes the internal surface 36 from which the indicia 34 projects radially inwardly, and a generally radially outwardly facing outer, exterior, or external surface 38. Also, the container 20 has a radial wall thickness 27 between the internal and external surfaces 36, 38. As used herein, the terminology "generally radially" need not be in a direction strictly perpendicular to the axis A of the container 20 and includes a direction at an oblique angle, for example, perpendicular to the exterior surface of the container neck 28.

The indicia 34 includes embossments 40 that may be appear as inwardly projecting bulges or projections in cross section and may be spaced apart and corresponding to one another.

For example, the embossments 40 may include lands 48 that are longitudinally parallel to the container internal surface 36 and are radially inwardly with respect to the rest of the container internal surface 36, and sides 42 including fillets 44 extending inwardly from the internal surface 36 and rounds 46 extending from the fillets 44 to the lands 48. Accordingly, the sides 42 are not straight but are continuously curving, wherein each side 42 comprises an inflection point between, or a tangent of, the fillet 44 and the round 46. The lands 48 may include arc lengths that may be of circular or cylindrical shape, for instance, parallel to the external or internal surface of the container.

The resolution of the indicia 34 is surprisingly well-defined and legible, considering that the external surface 38 of the container is smooth in portions thereof that correspond to the indicia 34 with no scarring or other marks or design remnants. The inventors discovered that pre-forming the indicia 34 with subtle, continuously curving sides, and other novel geometry, dimensions, and/or dimensional relationships, into the external surface of a parison during the blank molding stage, results in a well-defined legible presentation of the indicia 34. In contrast to the internal surface 36, and in contrast to some other embossing techniques, the external surface 38 does not include V-shaped depressions. Rather, the external surface 38 may be substantially cylindrical, or conical (in a conical neck), or at least substantially circular in cross section.

In the illustrated example, the width of the embossments 40 in the circumferential direction, may be at least 2.4 mm. Also, the radial depth or thickness of the embossments 40 (from an internal surface of the lands 48 to an adjacent internal surface 36 of the container) is significantly less than the container wall thickness, but the embossments 40 protrude into the container interior.

In the illustrated example, the container wall thickness 27 may be 1.5 mm to 3.0 mm including all ranges, subranges, and values therebetween, and more specifically for example, about 2.25 mm. Also, the radial thickness of the embossments 40 may be 0.2 mm to 0.4 mm including all ranges, subranges, and values therebetween, for example, about 0.32 mm, i.e., 0.30 mm to 0.34 mm. Moreover, each fillet 44 may have a radius between 0.2 mm and 0.4 mm. including all ranges, subranges, and values therebetween, for example, about 0.3 mm, i.e., 0.28 mm to 0.32 mm. Each round 46 may have a radius between 1.25 mm and 1.75 mm including all ranges, subranges, and values therebetween, for example, about 1.5 mm, i.e. between 1.4 mm and 1.6 mm.

Accordingly, a ratio of the container wall thickness a region corresponding to and/or adjacent to the embossment) to the embossment radial thickness may be between 3:1 and 15:1, including all ranges, subranges, and values therebetween, and in the example above, the ratio may be about 7:1. According to the illustrated example, each fillet 44 may have a radius that is about equivalent to the radial thickness of the embossment 40. According to other examples, the ratio of the radius of the fillet 44 to the embossment radial thickness may be between 0.5:1 and 2:1. Also according to the illustrated example, the round 46 may have a radius that is about five times the radial thickness of the embossment 40 and about five times the size of the fillet 44. According to other examples, the ratio of the radius of the round 46 to the radial thickness of the embossment 40 may be between 3:1 and 9:1 including all ranges, subranges, and values therebetween.

Figure 4:
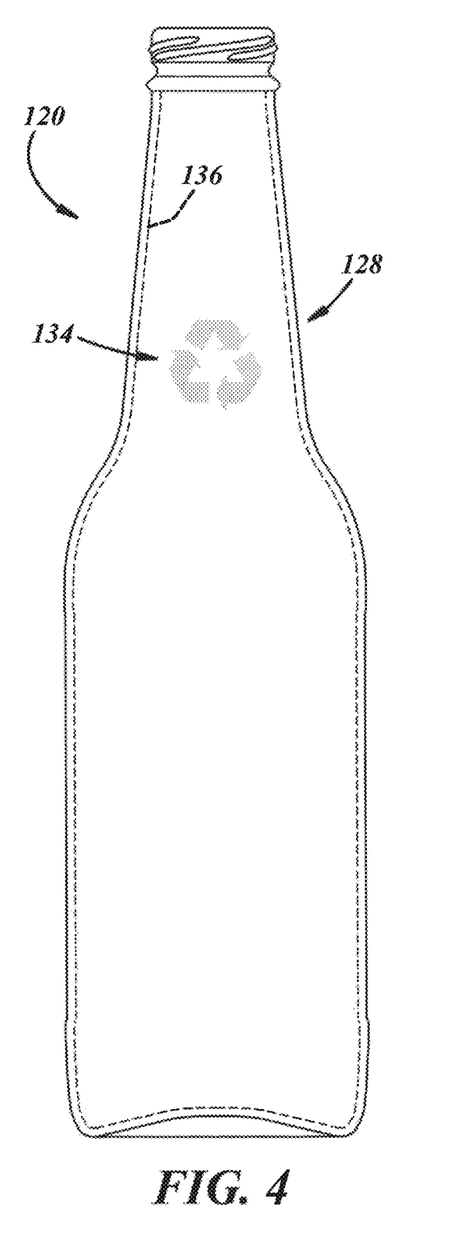
FIG. 4 is an elevational view of a bottle having well-defined, legible radially inwardly projecting graphics, in accordance with another illustrative embodiment of the present disclosure.

FIG. 4 illustrates another illustrative embodiment of a container 120. The container 120 includes integral indicia 134 on an interior or internal surface 136. As illustrated in FIG. 4, the indicia 134 includes a graphical logo and, more particularly, a recycling logo. The indicia 134 may be located on a neck 128 of the container 120 or in any other suitable location of the container 120. This embodiment is similar in many respects to the embodiment of FIGS. 1 through 3 and like numerals between the embodiments generally designate like or corresponding elements throughout the several views of the drawing figures. Accordingly, the descriptions of the embodiments are incorporated into one another, and description of subject matter common to the embodiments generally may not be repeated here.

Figure 5:
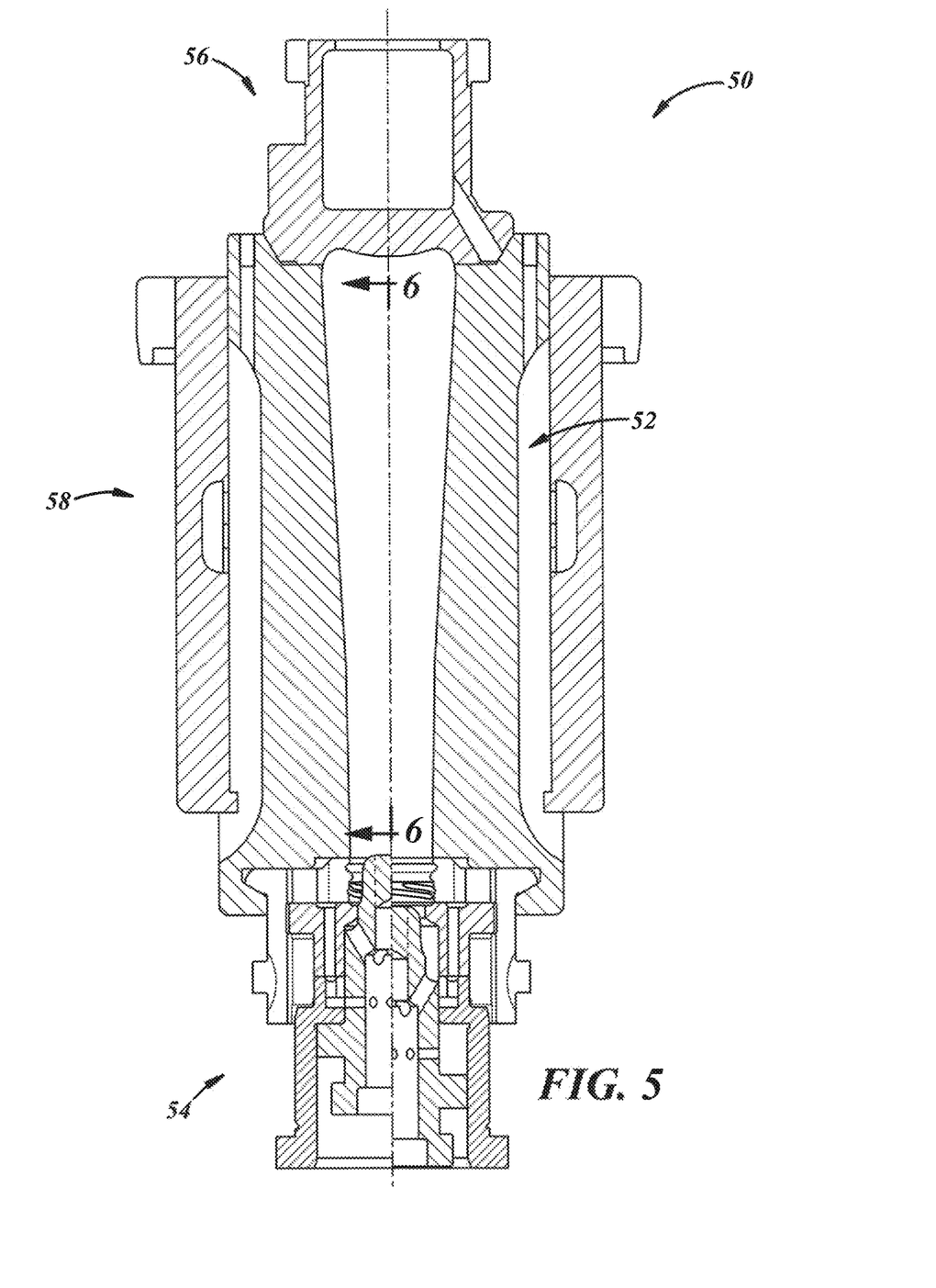
FIG. 5 is a longitudinal cross-sectional view of a blank mold assembly, in accordance with an illustrative embodiment of the present disclosure.

FIG. 5 illustrates an example blank mold assembly 50 that may be used to form a container preform or parison (not shown), which, in turn, may include features used to produce the indicia 34, 134 in the container 20, 120 of FIGS. 1-4. The assembly 50 may include a blank mold 52, a neck ring and plunger assembly 54 at one end of the mold 52, a baffle 56 at another end of the mold 52, and an adaptor and diffuser assembly 58 alongside the mold 52. The illustrated assembly 50 includes a blow-and-blow type of neck ring and plunger assembly 54, but those of ordinary skill in the art would recognize that the assembly 50 could instead include a press-and-blow assembly with a body plunger and the like. To produce a container preform or parison, a charge or gob of molten glass is placed within the blank mold 52 and a plunger and/or blow gas is introduced into the mold 52 to press and/or blow the glass into conformity with the mold components. Thereafter, the plunger and other mold components may be retracted to allow a parison to be removed from the assembly 50 and transferred to a blow mold.

Figures 6, 7, 9:
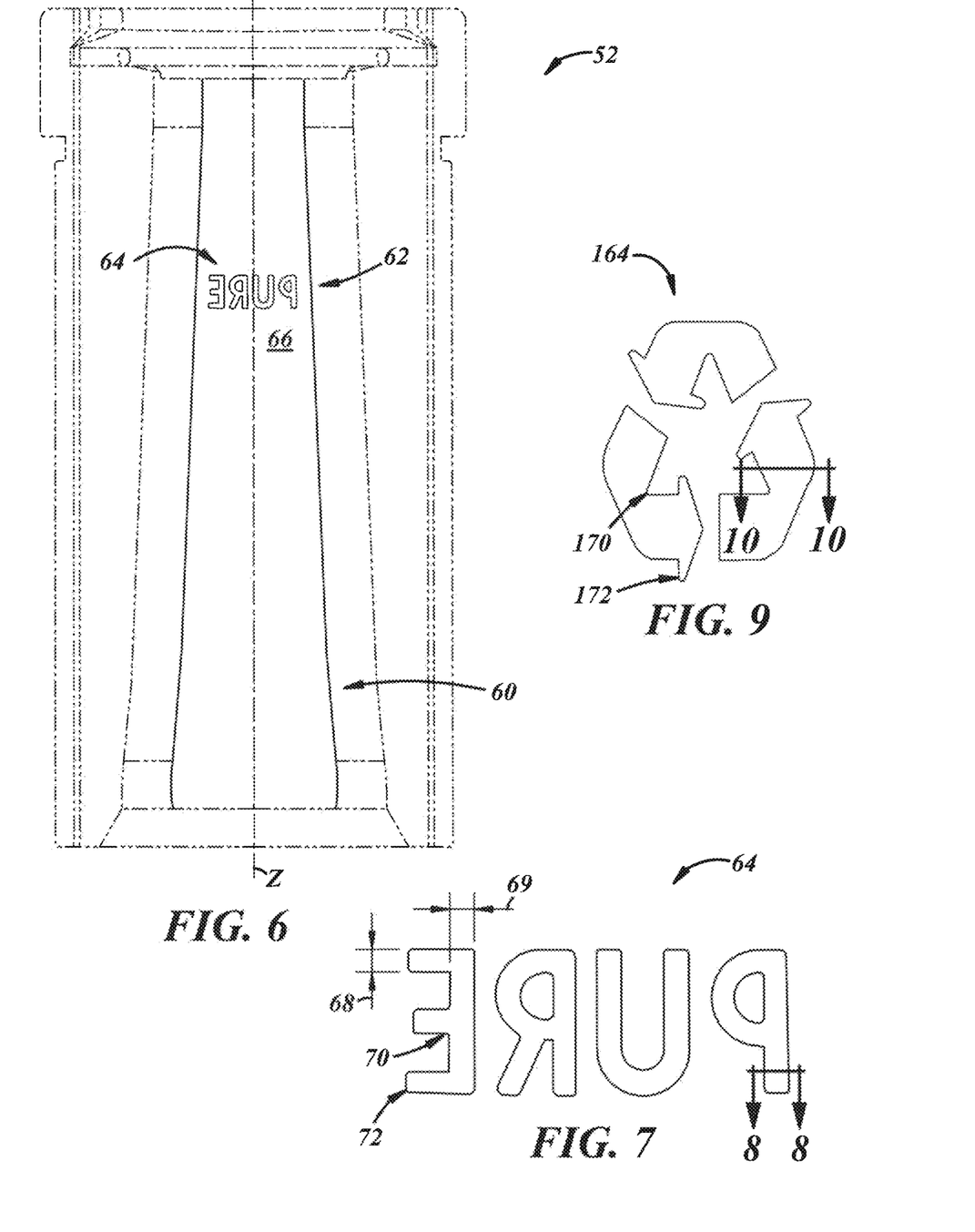
FIG. 6 is an elevational view of a blank mold of the assembly of FIG. 5, taken along line 6 of FIG. 5 and inverted therefrom.
FIG. 7 is an enlarged fragmentary view of an indicia engraving portion of the blank mold of FIG. 6.
FIG. 9 is an enlarged fragmentary view of an alternative portion of the blank mold of FIG. 6, illustrating a graphic engraving.

FIG. 6 illustrates the blank mold 52 as including a longitudinal axis Z, a body region 60, and a neck region 62. The mold 52 also includes indicia engraving 64 in a radially inwardly facing inner or internal surface 66 of the mold 52. In the embodiment illustrated in FIG. 6, the engraving 64 may be located in the neck region 62, but may be located in the body region 60 in other embodiments.

FIG. 7 more closely illustrates the engraving 64. The engraving 64 may include block text of one or more letters. In the example illustrated in FIG. 7, the heights of the letters are about 8.7 mm, and widths 68, 69 of the engraving within each letter may be of substantially uniform width, e.g., 1.2 mm to 2.5 mm. As used in this context, the term "substantially" includes within plus or minus 5%. Also, each letter may include its tightest fillets 70 and rounds 72 (or blends), that may face in longitudinal, circumferential, or both, directions. In the example illustrated in FIG. 7, the fillets 70 and rounds 72 may have radii of about 0.4 mm. As used herein, the term "about" includes within plus or minus 10%.

Figures 8, 10:
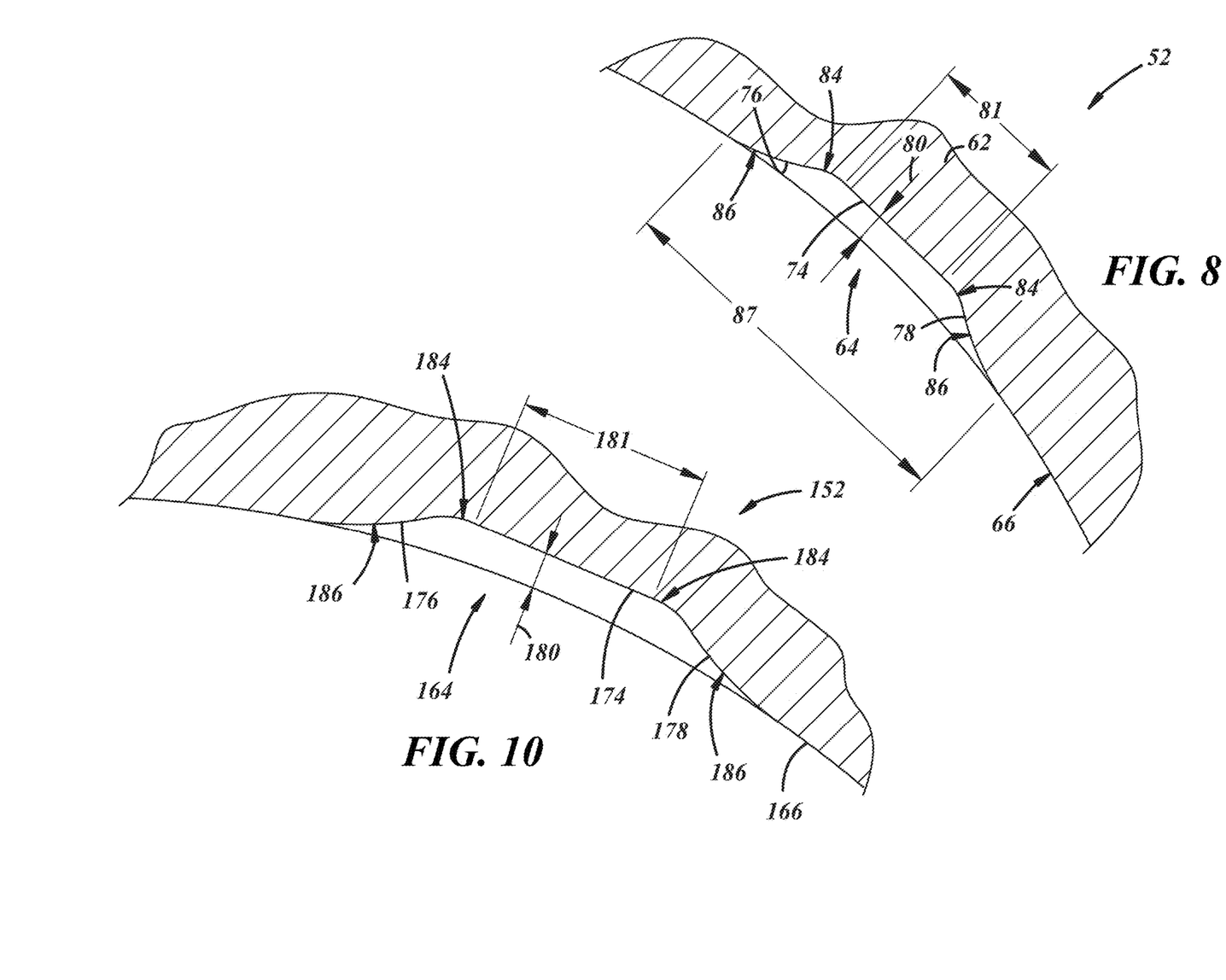
FIG. 8 is an enlarged, fragmentary, cross-sectional view of a portion of the blank mold of FIG. 6, taken along line 8-8 of FIG. 7.
FIG. 10 is an enlarged, fragmentary, cross-sectional view of the portion of FIG. 9, taken along line 10-10 of FIG. 9.

FIG. 8 shows a portion of the engraving 64 in cross section of the blank mold taken perpendicular to the longitudinal axis Z (FIG. 6 and FIG. 7). The engraving 64 includes a radially outward surface 74 that faces radially inward toward the central longitudinal axis Z (FIG. 6) of the mold 52. The radially outward surface 74 of the engraving 64 in the blank mold corresponds to the surface of the land 48 of embossment 40 of the container 20 shown in FIG. 2, and is substantially flat in the circumferential direction as well as in the axial/longitudinal direction. As used herein the phrase "substantially flat" can include a surface defined by a radius greater than the radius of the internal surface 66 of the mold 52 adjacent to or surrounding the engraving. The engraving 64 also includes first and second sidewalls 76, 78 facing circumferentially and radially inwardly and extending between the surface 74 and the internal surface 66 of the blank mold 52. Also, the engraving 64 has a radial depth 80 between the radially outward surface 74 and the internal surface 66 of the mold 52, and the radially outward surface 74 has a width 81. Additionally, the sidewalls 76, 78 are continuously curved, as each sidewall 76, 78 comprises an inflection point between, or a tangent of, a fillet 84 and a round 86.

In the illustrated example, the fillets 84 may have a radius between 0.2 mm and 0.4 mm including all ranges, subranges, and values therebetween, for example, about 0.3 mm, i.e., 0.28 mm to 0.32 mm. According to the illustrated example, the fillet 84 may have a radius that is about equivalent to the radial depth 80 of the engraving 64. According to other examples, the ratio of the radius of the fillet 84 to the engraving radial depth may be between 0.5:1 and 2:1 including all ranges, subranges, and values therebetween.

The rounds 86 or blends of the sidewalls 76, 78 are located between the fillets 84 and the internal surface 66 of the mold 52. In the illustrated example, the round 86 may have a radius between 1.25 mm and 1.75 mm including all ranges, subranges, and values therebetween, for example, about 1.5 mm, i.e. between 1.3 mm and 1.7 mm. According to the illustrated example, the round 86 may have a radius that is about five times the radial depth 80 of the engraving 64 and about five times the size of the fillet 84. According to other examples, the ratio of the radius of the round 86 to the engraving radial depth 80 may be between 3:1 and 9:1. The fillets and rounds 84, 86 may be produced by corresponding features in a tool used to produce the engraving, and/or by a wire brush after the engraving is cut or otherwise produced, or may be produced in any other suitable manner.

Accordingly, the engraving 64 has a circumferential overall width 87, for instance, where each round 86 meets the internal surface 66 of the mold. The width 87 may be greater than 2.4 mm. In any case, the relationship between the radial thickness of the engraving 64 and the fillets 84 and rounds 86 of the engraving 64 are such that the sidewalk 76, 78 are not flat/straight and, instead, are continuously curving and are characterized by the fillets 84 that each extend over an angle of less than 90° and the rounds 86 that are tangent to the fillets 84 at an inflection point between the surface 74 and the internal surface 66.

In the illustrated example, the radial depth 80 of the engraving 64 may be 0.2 mm to 0.4 mm including all ranges, sub-ranges, and values therebetween. For example, the radial depth 80 may be about 0.32 mm, i.e., 0.30 mm to 0.34 mm. In any case, the radial depth 80 is such that there is at least some "push-through" of container material into the interior of the container to produce well-defined, legible indicia. Also, in the illustrated example, the circumferential width 81 of the surface 74, for example, in the circumferential direction, is greater than 1.0 mm. Width 81 pertains only to the width of surface 74 and does not include the fillets 84 or rounds 86. Accordingly, a ratio of the container wall thickness (in a region corresponding to and/or adjacent to the embossment) to the engraving radial depth may be between 3:1 and 15:1, including all ranges, subranges, and values therebetween, and in a specific example, the ratio may be about 7:1.

FIG. 9 illustrates another embodiment of an engraving 164. In the example illustrated, the overall height of the logo engraving 164 may be about 18 mm, the overall width may be about 14.7 mm, and widths of the elements of the engraving 164 may range from about 3 mm to about 7 mm. Also, each element of the engraving 164 may include tightest fillets 170 and rounds 172 facing in longitudinal, transverse, or circumferential directions. In the example illustrated in FIG. 9, the fillets 170 may have radii of about 0.1 mm to 0.3 mm and all ranges, subranges, and values therebetween, and, more specifically about 0.2 mm. Whereas the rounds 172 may have radii of about 0.3 mm.

FIG. 10 shows a portion of the engraving 164 in cross section taken perpendicular to a mold longitudinal axis (see FIG. 9). The engraving 164 may be circumferentially centered in a mold 152, and includes a radially outward surface 174, and sidewalk 176, 178 connecting the radially outward surface 174 to a radially inwardly facing inner or internal surface 166 of the mold 152. The radially outward surface 174 may be of similar geometry to the internal surface. The engraving 164 also includes fillets 184, and blends or rounds 186 having the same sizes as described with respect to FIG. 8. In the illustrated example, a radial thickness 180 of the engraving 164 may be the same as that of FIG. 8, whereas a circumferential width 181 of the surface 174 may be two to three times greater or even more.

In the embodiments of FIGS. 7-10, the radii of the fillets 84, 184 may be less than the radial thicknesses 80, 180 of the engravings 64, 164. The radii of the rounds 86, 186 are greater than the radii of the fillets 84, 184. Accordingly, the radial thicknesses 80, 180 of the engravings 64, 164 are less than the radii of the rounds 86, 186.

Figure 11:
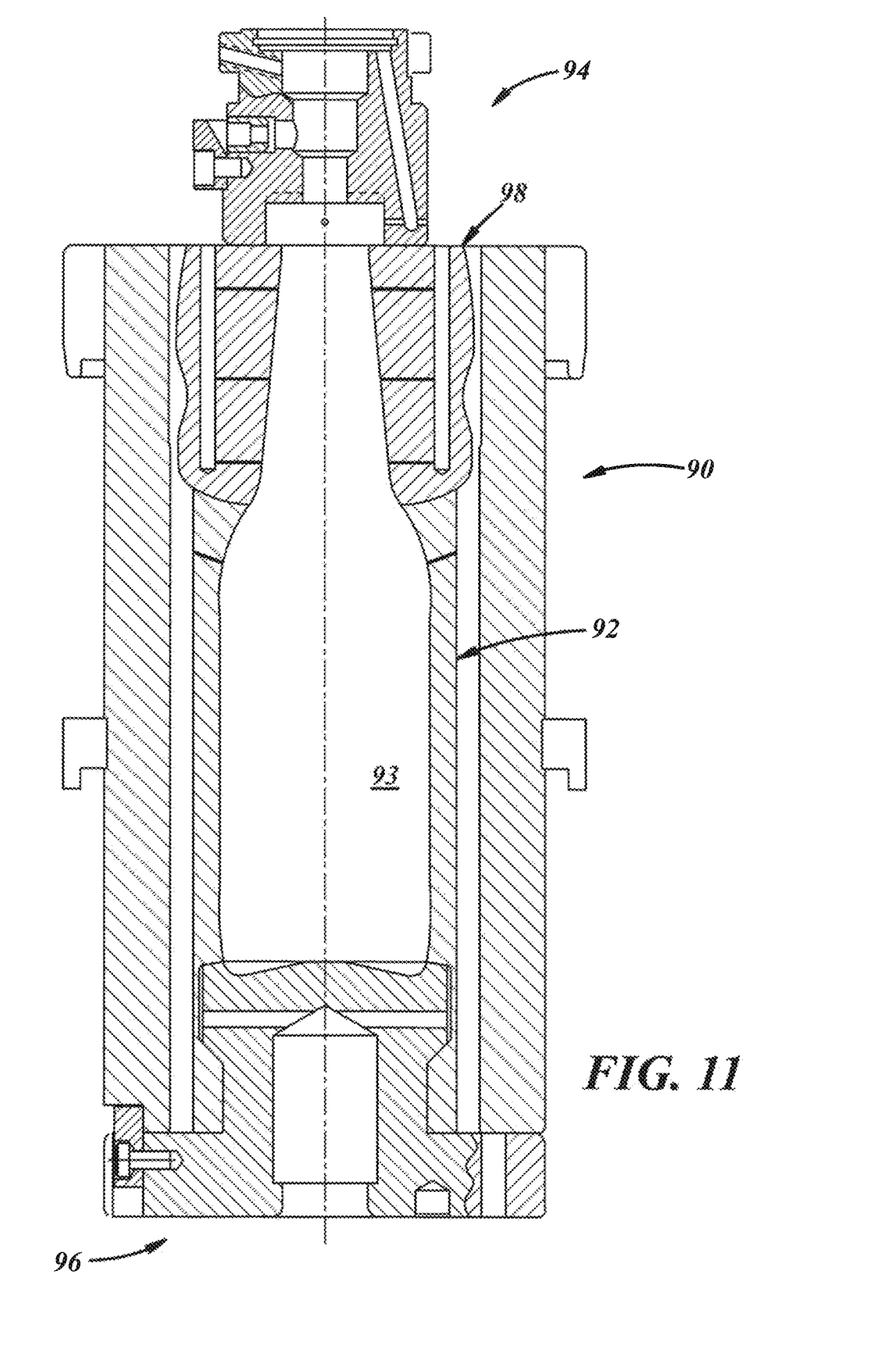
FIG. 11 is a longitudinal cross-sectional view of a blow mold assembly, in accordance with an illustrative embodiment of the present disclosure.

FIG. 11 illustrates an example blow mold assembly 90 that may be used to form the container 20 of FIG. 1 from a parison formed in the blank mold 52 (FIG. 5). The assembly 90 may include a blow mold 92 having an interior or internal surface 93, a blow head 94 at one end of the mold 92, a bottom plate 96 at another end of the mold 92, and a neck insert 98 carried at the blow end of the mold 92. A blow gas is directed through the blow head 94 and into an open end and the interior of the parison to expand the parison into conformity with the blow mold assembly 90. Those of ordinary skill in the art would recognize that a vacuum can be applied to the exterior of the parison to pull the parison into engagement with the mold surfaces.

Figure 12:
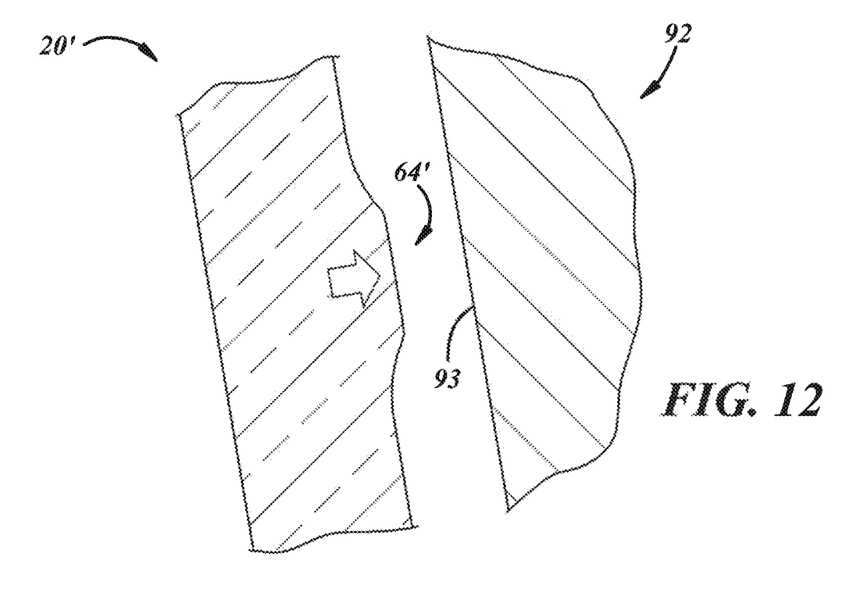
FIG. 12 is an enlarged, fragmentary, schematic, cross-sectional view of a parison wall being blown toward an internal surface of a blow mold of the blow mold assembly of FIG. 11.
Figure 13:
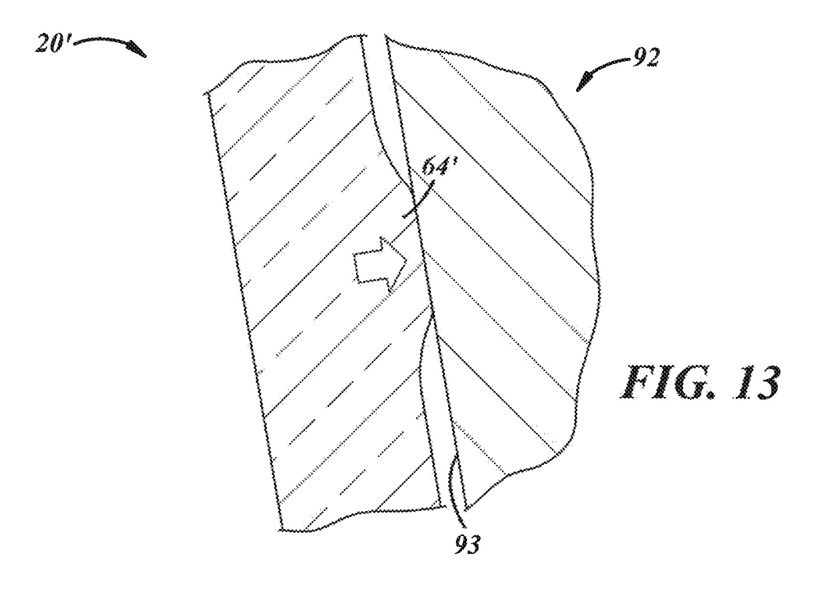
FIG. 13 is an enlarged, fragmentary, schematic, cross-sectional view of a parison wall being blown into contact with an internal surface of a blow mold of the blow mold assembly of FIG. 11.
Figure 14:
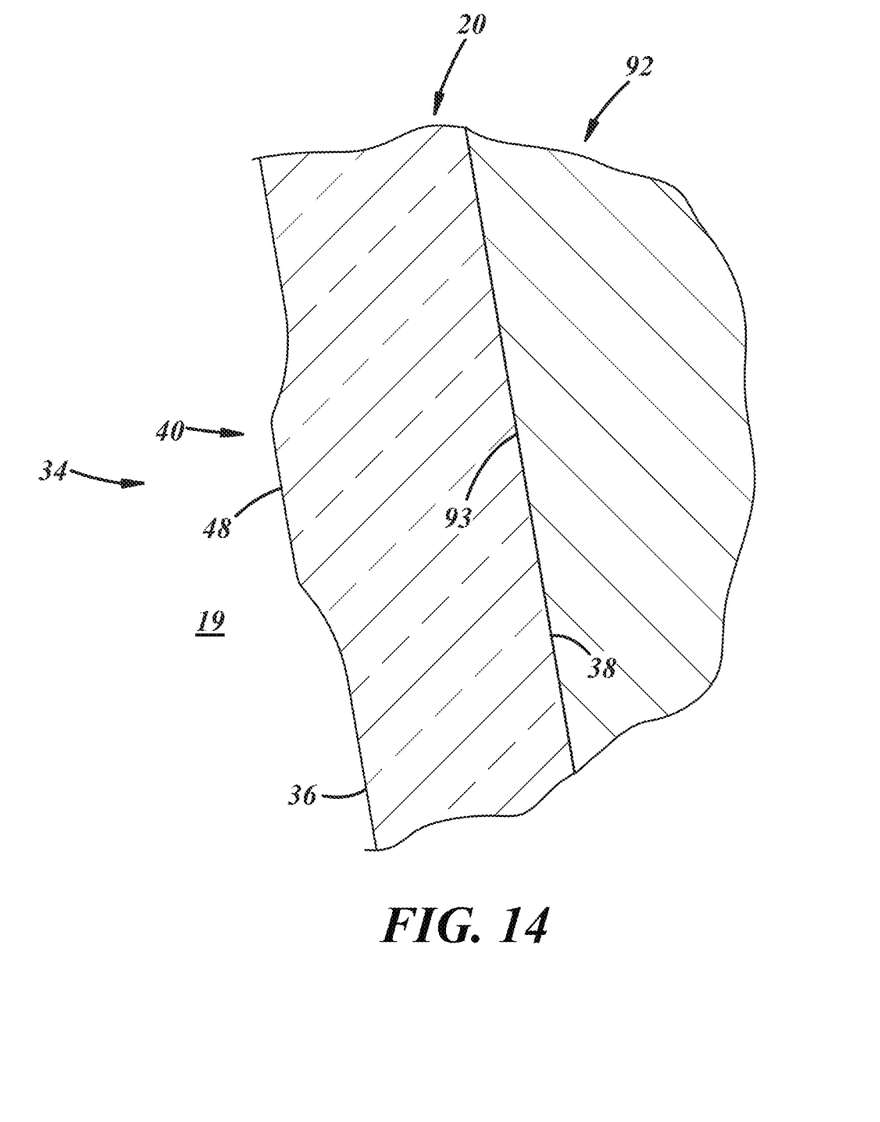
FIG. 14 is a further enlarged, fragmentary, schematic, cross-sectional view of the parison blown against the internal surface of the blow mold of FIG. 11 to create a container, and illustrating a parison embossment pushed into a container wall so as to push corresponding container wall material through to the interior surface of a container wall.

FIGS. 12-14 illustrate, schematically, a portion of the blow mold 92 of FIG. 11 and the parison 20' including an embossment 64' produced by the engraving 64 of the blank mold 52 of FIGS. 5-8. The parison 20' is blown so as to expand outwardly toward the blow mold 92 as shown in FIG. 12, and so as to drive the embossment 64' into contact with the internal surface 93 of the blow mold 92 as shown in FIG. 13. The parison 20' is further blown so as to further drive other portions of the parison 20' around the embossment 64' into contact with the internal surface 93 of the blow mold 92 as shown in FIG. 14 to form the container 20 having visible indicia 34 with no scarring or remnant on the container external surface 38 which is smooth (FIG. 2). Accordingly, the blow mold 92 acts to push the embossment 64' into the wall thickness of the container 20 so as to push container material so as to protrude radially inwardly from an interior surface of the container 20. The blank embossment 64' smoothly bends into the wall of the container 20, to form the corresponding container embossment 40 with its land 48, by pushing corresponding material through the wall of the container 20 into an interior 19 of the container 20. It is believed that one or more aspects of the presently disclosed engraving geometry, dimensions, or dimensional relationships allows portions of the Hank embossment 64' to slide outwardly, instead of fold or buckle, into the wall of the container as the embossment 64' is pushed into the container wall. The shape of the embossment 40 generally may be a duplication of the shape of the blank/parison embossment 64', albeit with some distortion and loss of definition after being pushed through the container wall.

Figure 15:
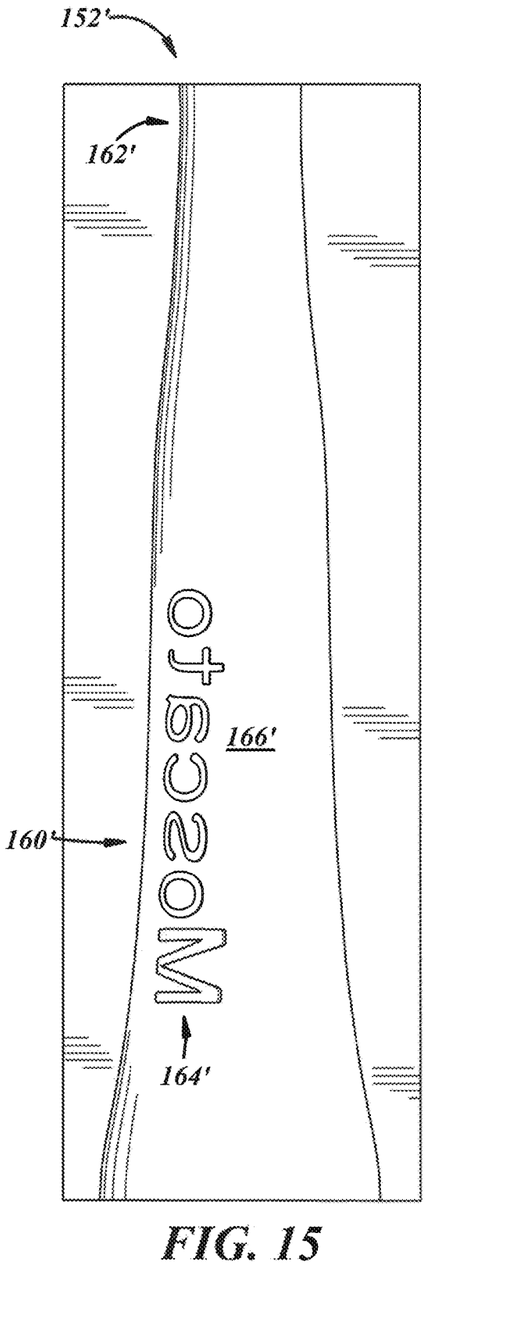
FIG. 15 is an elevational view of a blank mold body for producing a parison for a wine bottle, and including block text.
Figure 16:
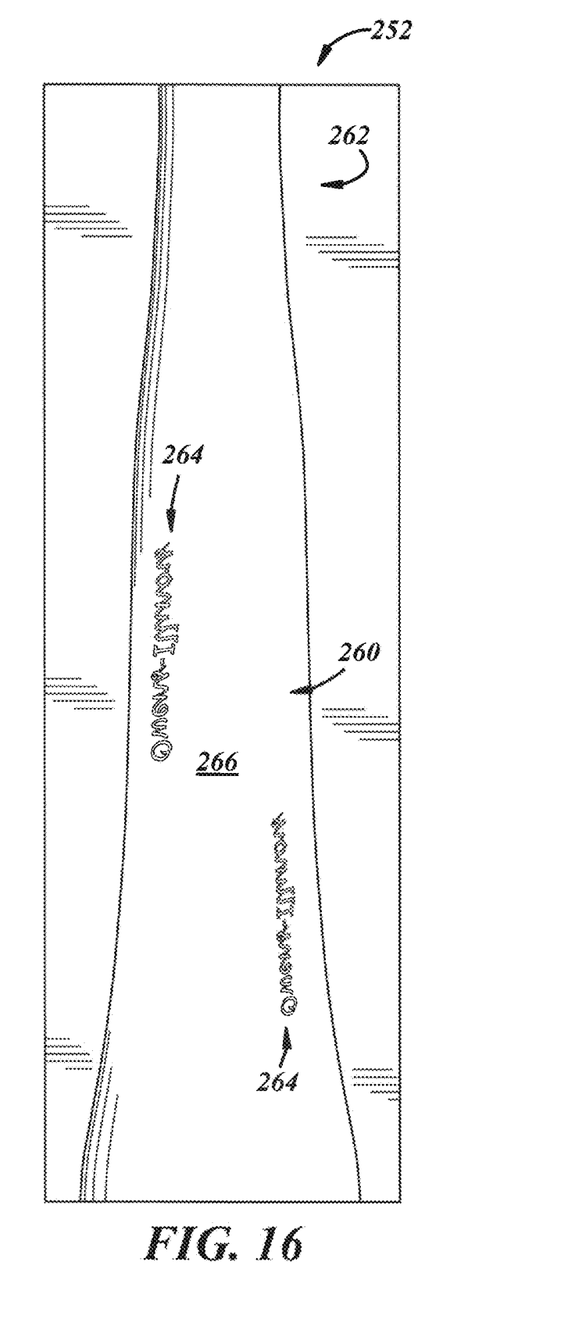
FIG. 16 is an elevational view of a blank mold body for producing a parison for a. wine bottle, and including script lettering or text.
Figure 17:
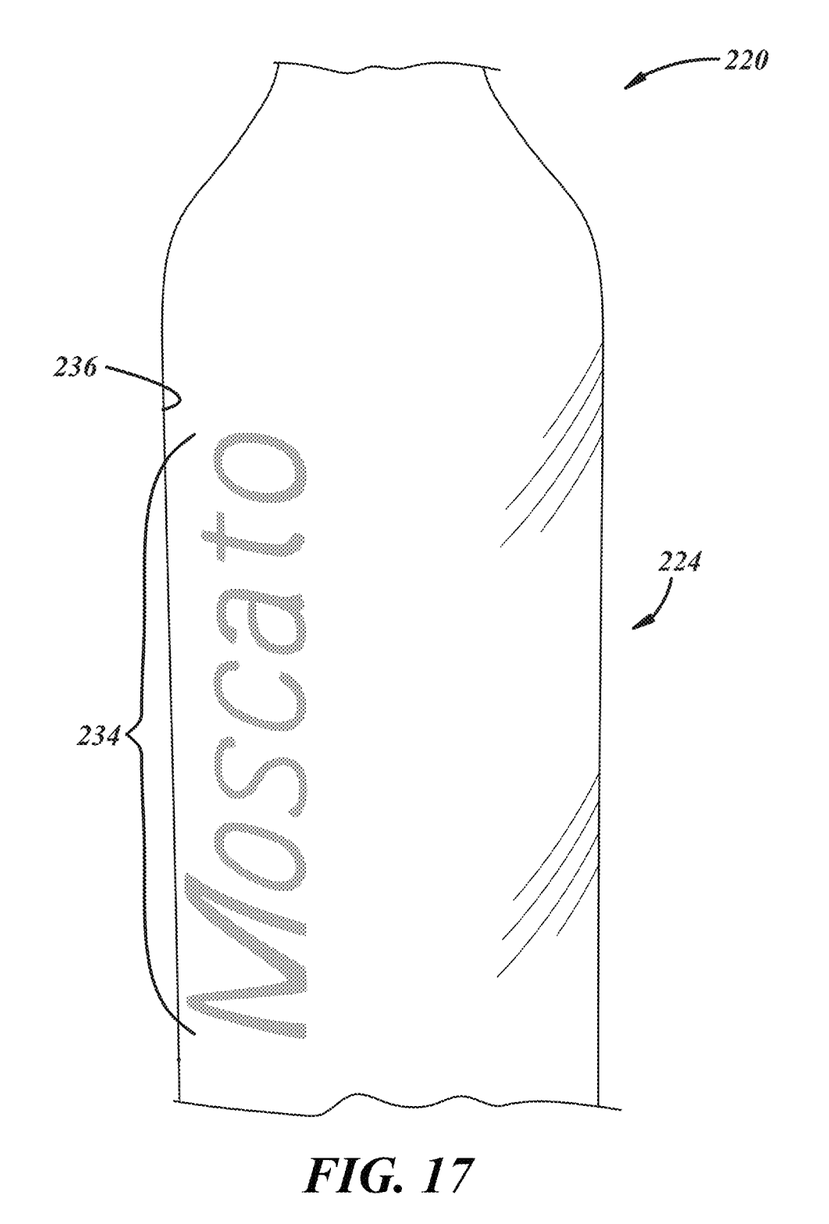
FIG. 17 is a fragmentary elevational view of a wine bottle produced by the blank mold body of FIG. 15 and illustrating well-defined, legible, radially inwardly projecting text in a front of the bottle.

FIGS. 15 through 17 show another illustrative embodiment according to the present disclosure. This embodiment is similar in many respects to the embodiments of FIGS. 1 through 14 and like numerals between the embodiments generally designate like or corresponding elements throughout the several views of the drawing figures. Accordingly, the descriptions of the embodiments are incorporated into one another, and description of subject matter common to the embodiments generally may not be repeated here.

With reference to FIG. 15, a blank mold 152' includes a body portion 160' and a neck portion 162', and a radially inwardly facing inner or internal surface 166'. The internal surface 166' at the body portion 160' includes an indicia engraving 164' of block text.

Similarly, with reference to FIG. 16, a blank mold 252 includes a body portion 260 and a neck portion 262, and a radially inwardly facing inner or internal surface 266. The internal surface 266 at the body portion 260 includes indicia engravings 264 of script lettering or text.

In either case, and with reference to FIG. 17, the presently disclosed apparatus, process, and dimensional teachings may be used to produce a container 220 from the parison formed in the blank mold 152 (FIG. 15), having a body 224 with well-defined, legible indicia 234, in an interior or internal surface 236 of the body 224. Those of ordinary skill in the art recognize that a parison may stretch during manufacturing, particularly when being transferred from a blank mold to a blow mold. Accordingly, it is believed that producing the indicia 234 in a container body may involve some application-specific adjustments to be made to the engraving geometry to account for such stretching. For example, some engraving geometry may need to be compressed to compensate for elongation of the embossment features in the parison due to parison stretching. Nevertheless, the presently disclosed methods will be able to be used to produce the well-defined, legible indicia of the present disclosure in container bodies.

The present disclosure provides an advancement in the art. Some prior approaches to embossing containers produced results satisfactory for their particular intended purposes, but would result in thick and wide radially inwardly projecting embossments that are not sufficiently resolute so as to be useful in providing well-defined legible indicia like lettering and logos. Other prior approaches to embossing containers likewise produced results satisfactory for their intended purposes, but could result in scarring of external surfaces of the containers in the vicinity of the embossments such that the external surfaces have a scratched appearance on and/or adjacent to the embossments. The shapes and dimensions of mold engravings for prior approaches may have been effective for achieving the particular results sought for those particular approaches, but were not effective for achieving the particular results presently taught herein.

According to conventional wisdom, it was believed that blank mold engravings for producing indicia embossments had to be relatively deep and steeply angled, with straight or flat sidewalls and tight fillets and rounds, in order to achieve a desired level of legibility of the embossments. From the present disclosure, it is now possible to produce a container having embossed indicia with improved resolution, using a blank mold having certain geometry, dimensions, and/or dimensional relationships to produce blank embossments for pushing of material through a wall of the container into the container interior during blow molding. More specifically, the present disclosure enables unexpectedly good results in the form of containers with surprisingly well-defined, legible indicia projecting radially inwardly from a container interior surface, and without producing scarring on the exterior surface of the container. Such results are different in kind and not merely in degree from the results of prior approaches. It is believed that two or more of the parameters/variables of the disclosed mold interact in an unexpected manner to provide the surprisingly good results taught herein.

There thus has been disclosed a container that fully satisfies all of the of and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A glassforming blank mold having an internal surface and an engraving in the internal surface, wherein the engraving, in cross section, includes:
   a radially outward surface, and
   sidewalls connecting the radially outward surface to the internal surface of the blank mold and including fillets and rounds between the radially outward surface and the internal surface of the blank mold, such that the sidewalls are not straight but, instead, are continuously curving,
   wherein a circumferential width of the radially outward surface is at least 1.0 mm, a radial thickness between the internal surface and the radially outward surface is 0.2 mm to 0.4 mm, the fillets have radii between 0.2 mm and 0.4 mm, the rounds have radii between 1.25 mm and 1.75 mm such that a ratio of radii of the rounds to an engraving radial depth is between 3:1 and 9:1, and a circumferential overall width of the engraving is at least 1.8 mm.

2. The mold set forth in claim 1, wherein each of the fillets extends over an angle of less than 90°.

3. The mold set forth in claim 1, wherein the sidewalls are characterized by an inflection between the fillets and the rounds.

4. The mold set forth in claim 1 wherein a ratio of radii of the fillets to an engraving radial depth is between 0.5:1 and 2:1.

5. The mold set forth in claim 1 wherein a ratio of a container wall thickness to an engraving radial depth is between 3:1 and 15:1.

6. A method of making a glass container having a base, a body extending axially from the base, and a generally radially outwardly facing external surface, the method including the steps of:
   (a) providing the glassforming blank mold of claim 1;
   (b) forming a parison into conformity with the internal surface of a blank mold including the engraving in the internal surface to form an embossment on an exterior surface of the parison; and
   (c) blowing the parison into conformity with an internal surface of a blow mold to produce a container from the parison, including pushing the embossment against the blow mold internal surface into a wall of the container so as to push corresponding material through the wall of the container into an interior of the container.

7. The method set forth in claim 6 wherein the providing step (a) includes the engraving being located in at least one of a neck portion or a body portion of the blank mold such that the embossment is formed on at least one of a neck portion or a body portion of the parison.

8. A glassforming blank mold having an internal surface and an engraving in the internal surface, wherein the engraving, in cross section, includes:
   a radially outward surface and sidewalls connecting the radially outward surface to the internal surface of the blank mold, wherein the sidewalls comprise fillets and rounds, such that the sidewalls are not straight but, instead, are continuously curving,
   wherein the rounds have radii between 1.25 mm and 1.75 mm such that a ratio of radii of the rounds to a radial depth of the engraving is between 3:1 and 9:1.

9. The mold set forth in claim 8, wherein a ratio of radii of the fillets to the radial depth of the engraving is between 0.5:1 and 2:1.

10. The mold set forth in claim 8 wherein a ratio of a container wall thickness to the radial depth of the engraving is between 3:1 and 15:1.

11. The mold set forth in claim 8 wherein a circumferential width of the radially outward surface is at least 1.0 mm, a radial thickness between the internal surface and the radially outward surface is 0.2 mm to 0.4 mm, the fillets have radii between 0.2 mm and 0.4 mm, and a circumferential overall width of the engraving is at least 1.8 mm.

12. A method of making a glass container having a base, a body extending axially from the base, and a generally radially outwardly facing external surface, the method including the steps of:
   (a) providing the glassforming blank mold of claim 8;
   (b) forming a parison into conformity with the internal surface of a blank mold including the engraving in the internal surface to form an embossment on an exterior surface of the parison; and
   (c) blowing the parison into conformity with an internal surface of a blow mold to produce a container from the parison, including pushing the embossment against the blow mold internal surface into a wall of the container so as to push corresponding material through the wall of the container into an interior of the container.

13. The method set forth in claim 12, wherein the providing step (a) includes the engraving being located in at least one of a neck portion or a body portion of the blank mold such that the embossment is formed on at least one of a neck portion or a body portion of the parison.

* * * * *